United States Patent
Fan et al.

(10) Patent No.: US 7,590,298 B2
(45) Date of Patent: Sep. 15, 2009

(54) DECOMPRESSION WITH REDUCED RINGING ARTIFACTS

(75) Inventors: Zhigang Fan, Webster, NY (US); Ricardo de Queiroz, Brasilia (BR); Reiner Eschbach, Webster, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 702 days.

(21) Appl. No.: 11/402,602

(22) Filed: Apr. 12, 2006

(65) Prior Publication Data

US 2007/0242891 A1    Oct. 18, 2007

(51) Int. Cl.
G06K 9/46 (2006.01)

(52) U.S. Cl. .................. 382/240; 382/233; 382/232

(58) Field of Classification Search .......... 382/100, 382/232, 233, 240; 370/527; 375/240.19, 375/240.24, E7.075; 348/E7.061
See application file for complete search history.

(56) References Cited

U.S. PATENT DOCUMENTS

| | | |
|---|---|---|
| 5,243,444 A | 9/1993 | Fan |
| 5,359,676 A | 10/1994 | Fan |
| 5,379,122 A | 1/1995 | Eschbach |
| 5,495,538 A | 2/1996 | Fan |
| 5,521,718 A | 5/1996 | Eschbach |
| 5,534,925 A | 7/1996 | Zhong |
| 5,757,975 A | 5/1998 | Eschbach et al. |
| 5,786,857 A | 7/1998 | Yamaguchi |
| 5,850,294 A | 12/1998 | Apostolopoulos et al. |
| 6,044,177 A | 3/2000 | Herley |
| 6,385,329 B1 * | 5/2002 | Sharma et al. ............. 382/100 |
| 6,574,372 B2 | 6/2003 | Ratnakar |
| 6,668,097 B1 | 12/2003 | Hu et al. |
| 6,738,524 B2 | 5/2004 | de Queiroz |
| 6,944,639 B2 | 9/2005 | Launiainen |
| 7,308,146 B2 * | 12/2007 | Becker et al. ............. 382/233 |
| 7,319,775 B2 * | 1/2008 | Sharma et al. ............. 382/100 |
| 2003/0081842 A1 | 5/2003 | Buckley |
| 2003/0223647 A1 | 12/2003 | So et al. |
| 2005/0031215 A1 | 2/2005 | Nomizu et al. |
| 2005/0185851 A1 | 8/2005 | Satoh et al. |

FOREIGN PATENT DOCUMENTS

EP    0 626 790 A1    11/1994

OTHER PUBLICATIONS

Fan, et al., "JPEG Decompression With Reduced Artifacts", Proceedings of the SPIE—The International Society for Optical Engineering USA, vol. 2186, Feb. 9, 1994, pp. 50-55, XP002116488.

(Continued)

Primary Examiner—Anh Hong Do
(74) Attorney, Agent, or Firm—Fay Sharpe LLP

(57) ABSTRACT

A process for improving the reconstruction of images compressed by the wavelet-based JPEG2000 specification. The basic reconstruction is followed by an edge-preserving filter (such as a sigma filter), another transform to the wavelet domain, an adjustment in the wavelet domain to yield the same quantized values as the compressed input image, and, finally, an inverse wavelet transform to yield the improved image. The process reduces the artifacts in sharp text and graphics documents, yielding images that would otherwise require larger files.

20 Claims, 5 Drawing Sheets

OTHER PUBLICATIONS

Gormish, et al., "JPEG 2000: Overview, Architecture, and Applications", Image Processing, 2000, Proceedings. 2000, International Conference on Sep. 10-13, 2000, Piscataway, NJ, vol. 2, Sep. 10, 2000, pp. 29-32.

Yang, et al., "Interative Projection Algorithms for Removing the Blocking Artifacts of Block-DCT Compressed Images", Plenary Special, Audio, Underwater Acoustics, VLSI, Neural Networks. Minneapolis, Apr. 27-30, 1993; [Proceedings of the International Conference on Acoustics, Speech, and Signal Processing (ICASSP)], New York, IEEE, US, vol. 5, Apr. 27, 1993, pp. 405-408.

European Search Report Jun. 11, 2008.

Gormish, Michael J., et al., "JPEG 2000: Overview, Architecture, and Applications" Proceedings of the IEEE International Conference in Image Processing, Vancouver, Canada, 2000.

\* cited by examiner

DECOMPRESSION WITH REDUCED RINGING ARTIFACTS

BACKGROUND

The present exemplary embodiment relates to an image processing system for decompressing image data.

With the expansion of the Internet as well as the explosive growth of digital storage devices, the use of compression techniques for storing and transporting multimedia content is becoming increasingly important. One multimedia compression protocol is JPEG (Joint Photographic Experts Group), which is used for storing still photographs or images. The original JPEG standard was created in the late 1980s and has become widely used on the Internet as well as in digital imaging equipment. In 1997, a call for proposals for the next generation JPEG standard, called JPEG 2000, was issued by the International Organization for Standardization (ISO), under whose guidance the original JPEG standard was promulgated. The first part of the draft standard (ISO/IEC 15444-1: JPEG 2000 image coding system) was released in 2000.

JPEG 2000 (also referred to as "J2K") supports both lossy and lossless compression of single-component (e.g., greyscale) and multi-component (e.g., color) imagery. In addition to this basic compression functionality, other features are provided, including 1) progressive recovery of an image by fidelity or resolution; 2) region-of-interest coding, whereby different parts of an image may be coded with differing fidelity or resolution; 3) random access to specific regions of an image without needing to decode the entire codestream; 4) flexible file format; and 5) good error resilience. Due to its improved coding performance and many attractive features, there is a very large potential application base for JPEG 2000. Some potential application areas include: image archiving, web browsing, document imaging, digital photography, medical imagery, and remote sensing.

At the core of the JPEG 2000 structure is a new wavelet based compression methodology that provides for a number of benefits over the Discrete Cosine Transformation (DCT) compression method, which was used in the original JPEG format. The DCT compresses an image into 8x8 blocks and places them consecutively in the file. In this compression process, the blocks are compressed individually, without reference to the adjoining blocks. This results in "blockiness" associated with compressed JPEG files. With high levels of compression, only the most important information is used to convey the essentials of the image. Thus, much of the subtlety that makes for a pleasing, continuous image is lost.

Nonetheless, during the standard JPEG 2000 compression process it has been found that undesirable oscillations, sometimes called "ringing," may be introduced in the compressed images. Ringing in JPEG 2000 images may be due, in part, to course quantization of high frequency wavelet coefficients. The ringing artifacts may be particularly severe in document images, where sharp edges are present in text and graphics are more likely to occur. Thus, quantization of wavelets is a major source of information loss in JPEG 2000 compression. As quantization is an M to one mapping (i.e., the same code can be generated by many different source images), it is difficult to guarantee the retrieval of the original input data.

Thus, there is a need for a JPEG 2000 decompression method and system that reduces ringing artifacts without introducing new artifacts.

BRIEF DESCRIPTION

Disclosed herein is a process for improving the decompression of images compressed by the wavelet-based JPEG 2000 specification. The basic decompression is followed by an edge-preserving filter (such as a sigma filter), another transform to the wavelet domain, an adjustment in the wavelet domain to yield the same quantized values as the compressed input image, and, finally, an inverse wavelet transform to yield the improved image. The process reduces the artifacts in sharp text and graphics documents, yielding images that would otherwise require larger files.

According to an aspect of the exemplary embodiment, a method of reducing artifacts introduced by a data compression procedure into digital image data to be outputted is provided. The method comprises: receiving compressed digital image data; performing decompression of the digital image data; filtering the decompressed digital image data with a smoothing filter; applying a wavelet transform to the filtered digital image data to obtain transform coefficients; making an adjustment to the transform coefficients in the wavelet domain to guarantee that the wavelets of the resulting image will generate the same compressed code; and recovering the image by applying an inverse wavelet transform to the adjusted transform coefficients.

According to another aspect of the exemplary embodiment, a method of reducing artifacts introduced by a data compression procedure into digital image data to be outputted is provided. The method comprises: receiving digital image data; performing decompression of the digital image data; storing the decompressed digital image data; filtering the decompressed digital image data; applying a wavelet transform to the filtered digital image data to obtain transform coefficients; making an adjustment to the transform coefficients in the wavelet domain to guarantee that the wavelets of the resulting image will generate the same compressed code; determining whether substantial changes have been made in the adjustment step; and outputting the stored image, if no substantial changes were made in the adjustment step.

According to yet another aspect of the exemplary embodiment, a method of reducing artifacts introduced by a data compression procedure into digital image data to be outputted is provided. The method comprises: receiving digital image data; performing decompression of the digital image data; storing the decompressed digital image data; filtering the decompressed digital image data; applying a wavelet transform to the filtered digital image data to obtain transform coefficients; making an adjustment to the transform coefficients in the wavelet domain to guarantee that the wavelets of the resulting image will generate the same compressed code; comparing the stored digital image data to the adjusted image and determining if there are only small changes to the filtered image data; and if there are only small changes to the filtered image data, then applying an inverse wavelet transform to the filtered image data to obtain a new image and outputting the new image.

DETAILED DESCRIPTION

Figure 1:
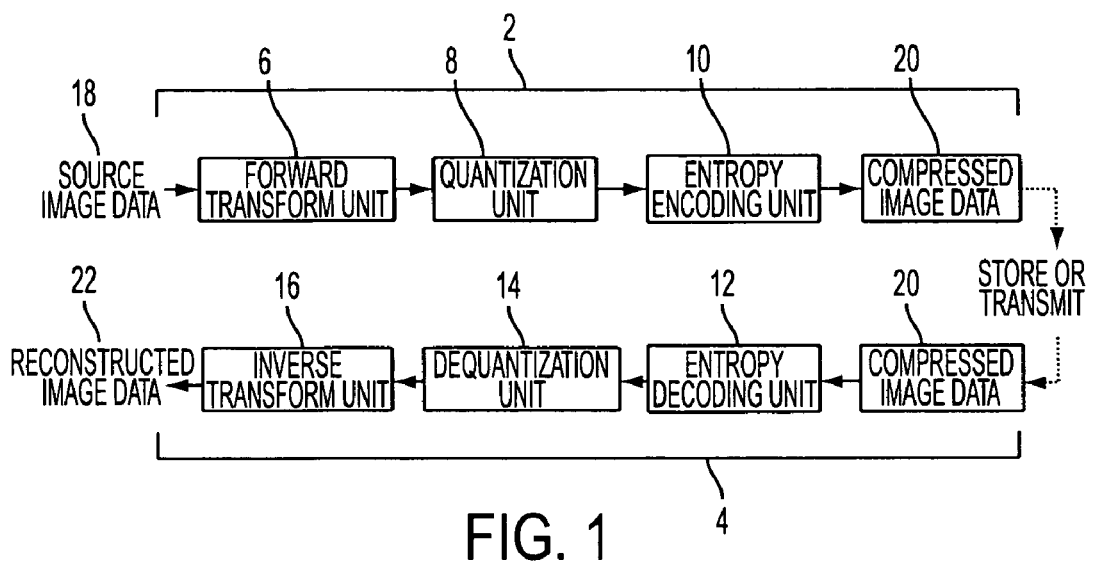
FIG. 1 is a functional block diagram of the basic JPEG 2000 encoder and decoder.

The detailed description that follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

For a general understanding of the exemplary embodiment, reference is made to the drawings. In the drawings, like reference numerals have been used throughout to designate identical elements.

A block diagram of a standard JPEG 2000 encoder 2 and decoder 4 is shown in FIG. 1. The basic functional blocks of the JPEG 2000 encoder 2 and decoder 4 include a forward transform unit 6, a quantization unit 8, an entropy encoding unit 10, an entropy decoding unit 12, a dequantization unit 14, and an inverse transform unit 16. The discrete wavelet transform is first applied (6) on the source image data 18. The transform coefficients are then quantized (8) and entropy coded (10), before forming the output codestream (bitstream) 20. The decoder 4 is the reverse of the encoder 2. The codestream 20 is first entropy decoded (12), dequantized (14) and inverse discrete wavelet transformed (16), thus resulting in the reconstructed image data 22. A description of the operation of each unit is described in detail in various public JPEG 2000 specifications of the Joint Photographic Experts Group (JPEG). For example, an article entitled: "JPEG 2000: Overview Architecture and Applications," by Gormish et. al., in Proceedings of the IEEE International Conference in Image Processing, Vancouver, Canada, 2000, (incorporated herein by reference), provides an overview of the JPEG 2000 image compression method. Details of this method can be found in the standards documentation: ISO/IEC IS 15444-1 entitled: "JPEG 2000: Image Coding System." The JPEG 2000 standard works on image tiles. The source image is partitioned into rectangular non-overlapping blocks in a process called tiling. These tiles are compressed independently as though they were entirely independent images. All operations, including component mixing, wavelet transform, quantization, and entropy coding, are performed independently on each different tile. The nominal tile dimensions are powers of two, except for those on the boundaries of the image. Tiling is done to reduce memory requirements, and since each tile is reconstructed independently, they can be used to decode specific parts of the image, rather than the whole image. Each tile can be thought of as an array of integers in sign-magnitude representation. This array is then described in a number of bit planes. These bit planes are a sequence of binary arrays with one bit from each coefficient of the integer array. The first bit plane contains the most significant bit (MSB) of all the magnitudes. The second array contains the next MSB of all the magnitudes, continuing in the fashion until the final array, which consists of the least significant bits of all the magnitudes.

Before the forward discrete wavelet transform, or DWT, is applied to each tile, all image tiles are DC level shifted by subtracting the same quantity, such as the component depth, from each sample. DC level shifting involves moving the image tile to a desired bit plane, and is also used for region of interest coding.

Figure 2:
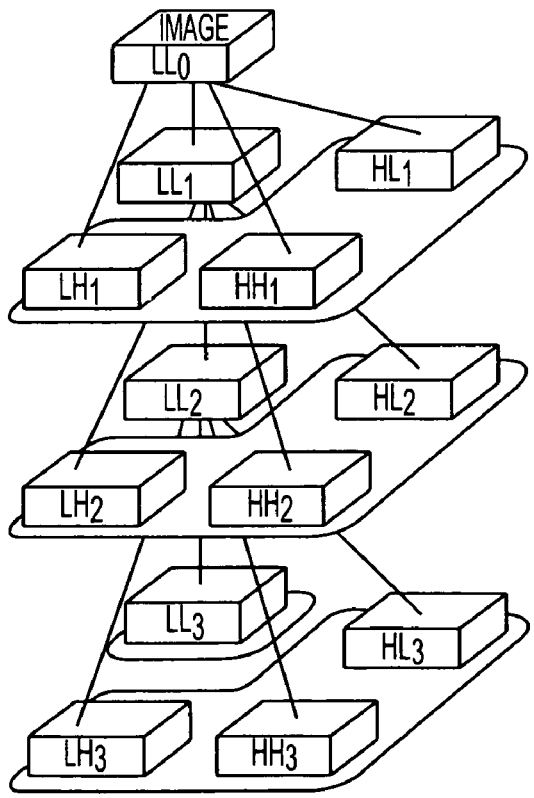
FIG. 2 is a schematic diagram of various levels of decomposition of tile components using a Discrete Wavelet Transform (DWT).

The forward transform unit 6 separates image data into plural sets of information concerning spatial frequency spectra. The tile components are decomposed using a Discrete Wavelet Transform (DWT), thus producing wavelet coefficients. The use of DWT provides the multi-resolution capabilities of JPEG2000. As shown in FIG. 2, a first DWT stage decomposes the original image ($LL_0$) into four sub-bands, denoted by the labels $LL_1$, $HL_1$, $LH_1$, and $HH_1$. The labels indicate the filtering and decomposition level ($LL_1$=low-pass filtering horizontally, low-pass filtering vertically, at the 1st level of decomposition). These sub-bands are populated with wavelet coefficients that describe spatial frequency characteristics of the original image. The second stage further breaks down $LL_1$ into the four sub-bands $LL_2$, $HL_2$, $LH_2$, and $HH_2$. Although only three such stages are shown in FIG. 2, this process may continue for many stages. Each $LL_n$ sub-band is a reasonable low resolution rendition of $LL_{n-1}$ with half the width and height.

Returning to FIG. 1, each sub-band, comprised of coefficients produced in the forward transform (or DWT) unit 6, is subjected to uniform scalar quantization in the quantization unit 8. Quantization may be used to further compress the data stream by selecting a large quantization step size. However, the JPEG2000 standard does not require any particular method to select a step size, and each sub-band is allowed its own step size.

The entropy encoding unit 10 performs entropy encoding for each set of quantized information and then outputs the result as a compressed process result 20. The entropy encoding unit 10 employs EBCOT (Embedded Block Coding with Optimized Truncation) to divide the quantized information into bit planes and to then further divide each bit plane into sub-bit planes. In division to sub-bit planes, each bit plane is divided into a plane which includes information predicted to be significant for decoding, a plane which includes information predicted not to be significant but to affect reproduction, and a plane which includes information predicted to be neither significant nor of affect. The entropy encoding unit 10 performs an algebraic encoding to each bit in a sub-bit plane.

The compressed result 20 comprises a bit stream based on information sequentially input in accordance with information about each spatial frequency spectrum. More specifically, the output 20 comprises a data structure in which information regarding compressed results corresponding to information regarding various spectra may be arranged in order of increasing spatial frequencies.

The general structure of the decoder 4 is illustrated in FIG. 1 as well. As is evident from the diagram, the decoder structure simply mirrors that of the encoder 2.

Figure 3:
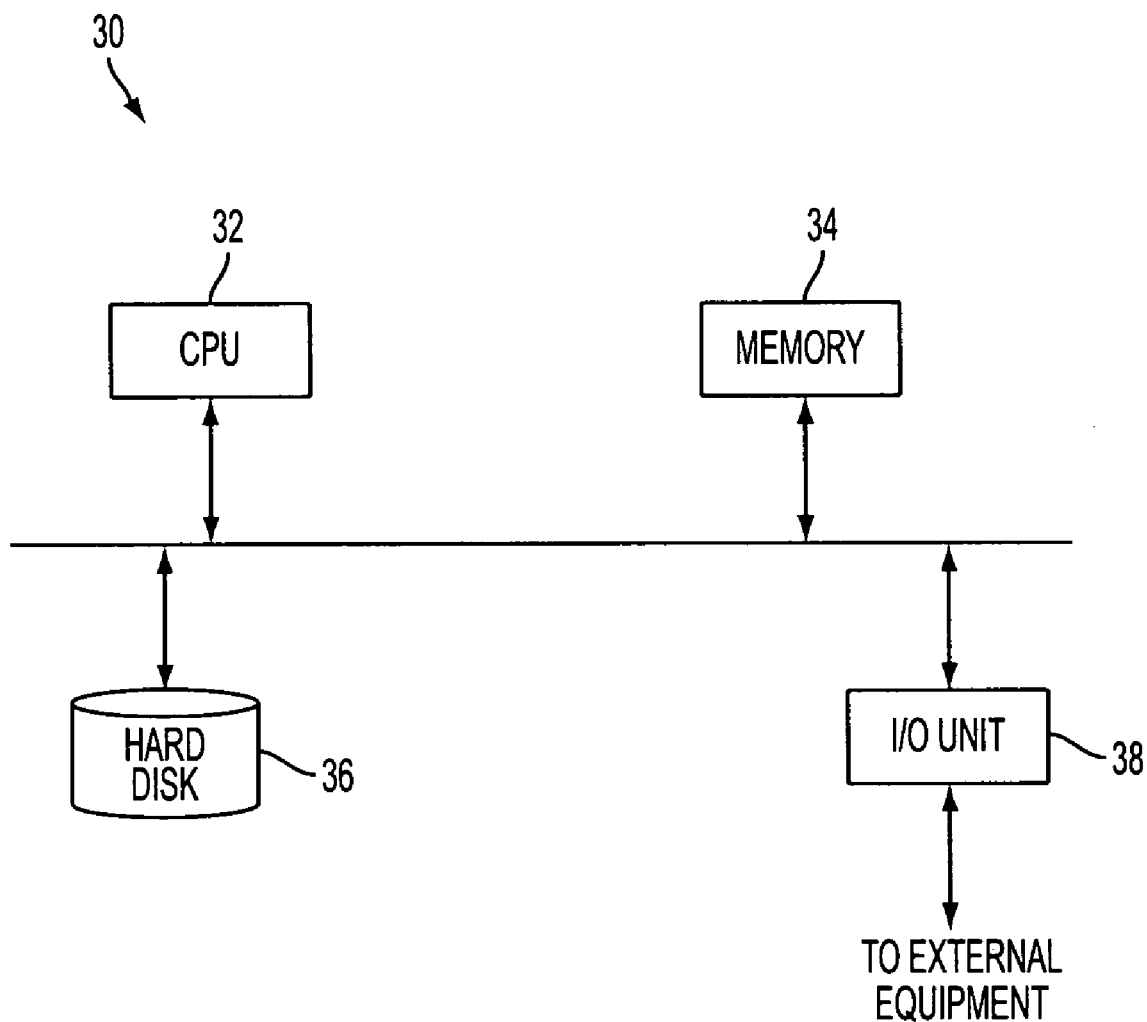
FIG. 3 is a block diagram illustrating the configuration of an example image processing system suitable for implementing aspects of the exemplary embodiment.

With reference now to FIG. 3, an exemplary embodiment of an image processing system 30 can be generally realized using a computer. Specifically, the image processing system 30, as shown in FIG. 3, includes a CPU 32, memory 34, a hard disk 36, and an input/output unit 38.

The CPU 32 operates in accordance with one or more programs stored in the hard disk 36. The CPU 32 stores input image data in memory 34 as a process object, performs a decompression process on the compressed image data, and then stores the results in memory 34. The decompression process result is output via the input/output unit 38. The specific content of the decompression process will be described in detail later. Memory 34 is rewritable, which works as a work memory for the CPU 32. The hard disk 36, which is an example of a computer readable recording medium, stores the program executed by the CPU 32. The input/output unit 38, which may be, for example, a USB (Universal Serial Bus) or a network interface, outputs external data to the CPU 32, and outputs data outside in accordance with the instruction input from the CPU 32.

Figure 4:
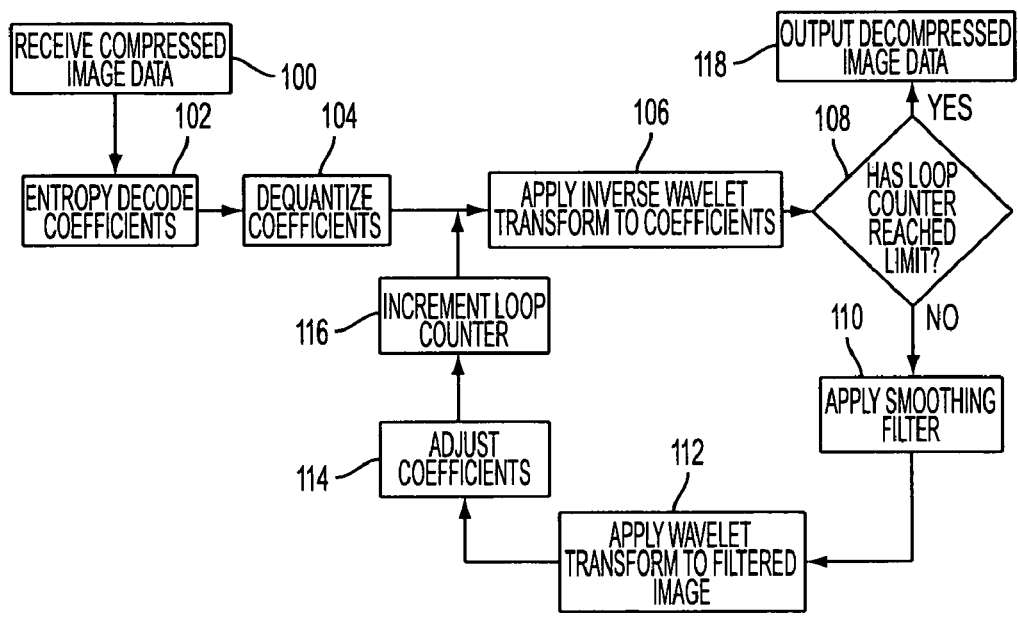
FIG. 4 is a flowchart illustrating an image processing program according to a first embodiment of the present exemplary embodiment.

Here, the content of a decompression process executed by the CPU 32 will be explained. The image processing program stored in the hard disk 38 includes functions as shown in FIG. 4. The operation of the image processing system in the present embodiment will be described. Initially, an image compressed in accordance with the basic JPEG 2000 compression method is received by the CPU 32 (100). Then, in accordance with the basic JPEG 2000 decompression method, the coefficients in the packets are entropy decoded (102) and dequantized (104), and the inverse wavelet transform is performed (106).

In the case of irreversible compression, standard JPEG 2000 decompression typically results in loss of data. That is, the resulting image may not be exactly like the original. For example, one unwanted artifact that may be found in the decompressed image is ringing. Accordingly, a "smoothing" procedure is performed for a specified number (n) of iterations to reduce these unwanted artifacts. Returning now to FIG. 4, a determination is made as to whether a loop counter, representing the number of adjustments that have been made to the image, has reached its limit (108). If not, then the smoothing procedure takes place.

First, the image is smoothed, preferably using an edge-preserving filter (110). An example of such a filter is a sigma filter, which was described in "Image Processing System and Method with Improved Reconstruction of Continuous Tone Images from Halftone Images Including Those without a Screen Structure," U.S. Pat. No. 5,243,444 to Fan. Next, the filtered image is wavelet transformed (112).

An adjustment is then made in the wavelet domain to guarantee that the wavelets of the resulting image will generate the same compressed code (114). The purpose of edge-preserving smoothing is to reduce ringing noise and bring the image close to the model. However, the filtered image does not necessarily conform to the original wavelet coefficients. It might introduce new artifacts such as over-smoothing. In order to prevent major deviation from the decompressed image from the original image, the wavelet adjustment step projects the filtered image back into the set of possible source images specified by the quantized wavelet coefficients. The simplest wavelet adjustment is performed as follows:

$$Y(m, n) = \begin{cases} U(m, n), & \text{if } X(m, n) > U(m, n) \\ L(m, n), & \text{if } X(m, n) < L(m, n) \\ X(m, n), & \text{otherwise} \end{cases} \quad (1)$$

where $X(m,n)$ and $Y(m,n)$ are the input and output of the operation and $L(m,n)$ and $U(m,n)$ are the lower and upper bounds for $(m,n)$ wavelet coefficients, respectively.

The loop counter is then incremented by one (116). Finally, an inverse wavelet transform brings the image back to the spatial domain (118). These steps can be applied recursively until the loop counter reaches its limit n.

Figure 5:
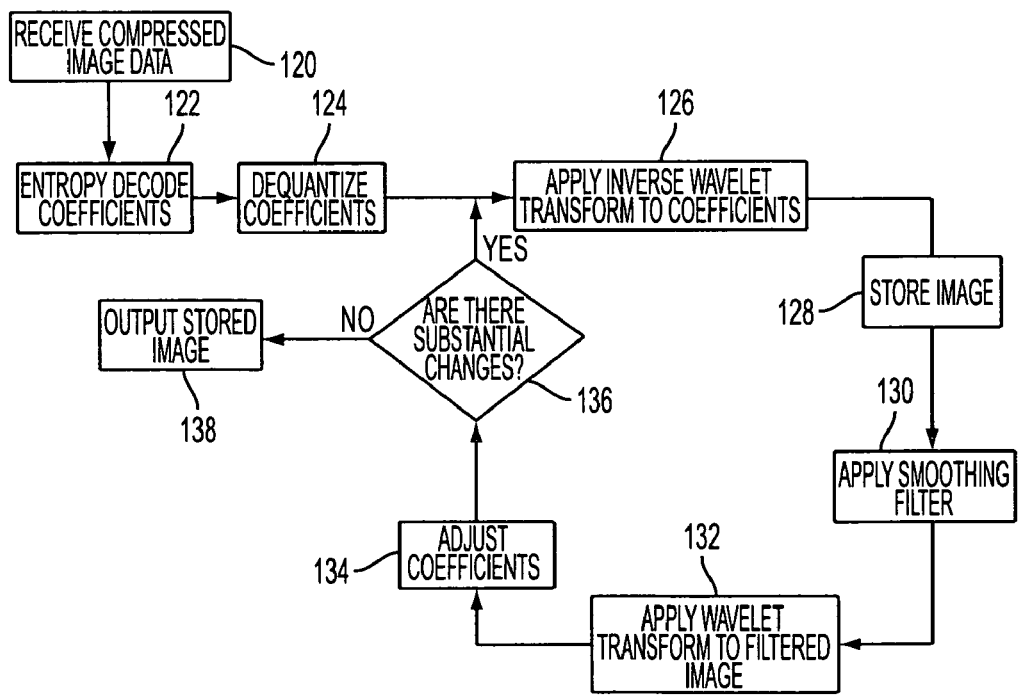
FIG. 5 is a flowchart illustrating an image processing program according to a second embodiment of the present exemplary embodiment.

An alternative embodiment of the decompression process is shown in FIG. 5. Initially, an image compressed in accordance with the JPEG 2000 compression method is received by the CPU 32 (120). Once again, in accordance with the basic JPEG 2000 decompression method, the coefficients in the packets are entropy decoded (122) and dequantized (124), and the inverse wavelet transform is performed (126).

To reduce ringing artifacts, a smoothing procedure is performed until a satisfactory result is achieved. First, the image is stored in memory 34 (128). Next, the image is smoothed, preferably using an edge-preserving filter such as a sigma filter (130). Next, the filtered image is wavelet transformed (132). An adjustment is made in the wavelet domain to guarantee that the wavelets of the resulting image will generate the same compressed code (134). Next, a determination is made as to whether substantial coefficient changes have been made in the adjustment step 134 (136). In other words, is the difference between the input and the output in equation (1) as defined as $\Sigma[Y(m,n)-X(m,n)]^2$ greater than a preset threshold t? If not, then the stored image is output (138). Otherwise, the smoothing process is repeated as necessary.

Figure 6:
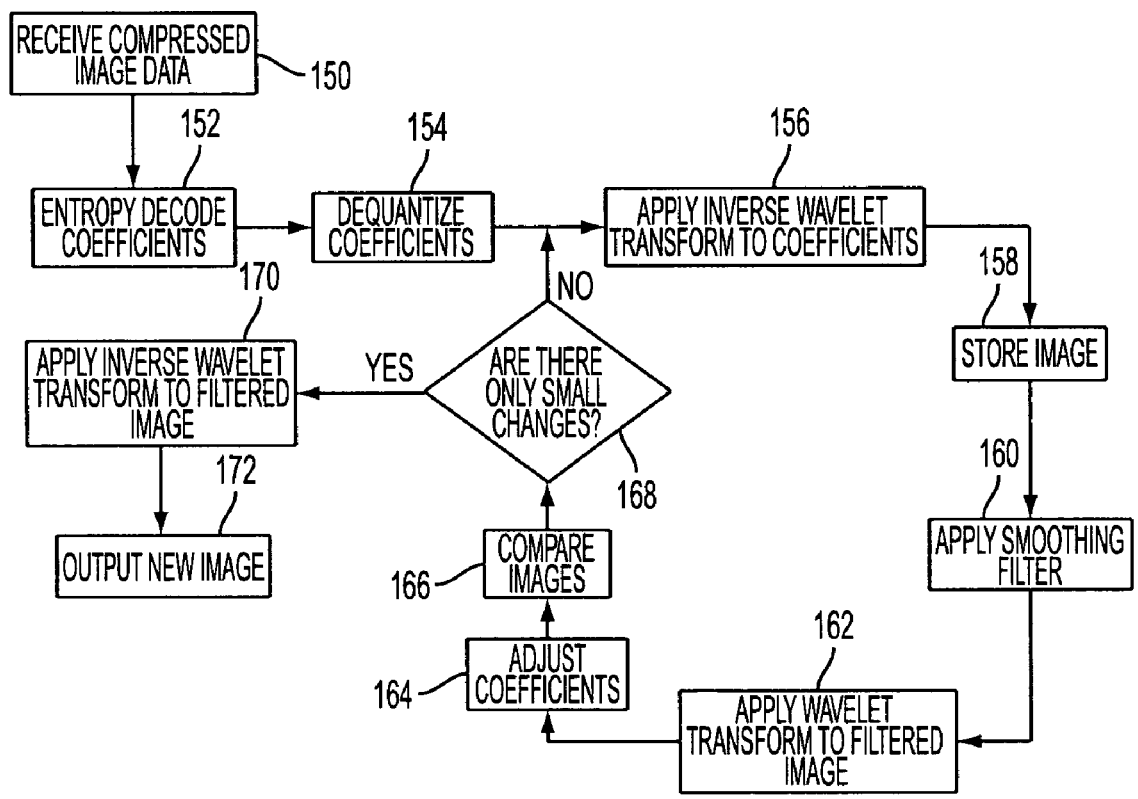
FIG. 6 is a flowchart illustrating an image processing program according to a third embodiment of the present exemplary embodiment.

Yet another embodiment of the decompression process is shown in FIG. 6. Initially, an image compressed in accordance with the JPEG 2000 compression method is received by the CPU 32 (150). In accordance with the basic JPEG 2000 decompression method, the coefficients in the packets are entropy decoded (152) and dequantized (154), and the inverse wavelet transform is performed (156).

Once again, to reduce ringing artifacts, a smoothing procedure is performed until a satisfactory result is achieved. First, the image is stored in memory 34 (158). Next, the image is smoothed, preferably using an edge-preserving filter such as a sigma filter (160). The filtered image is then wavelet transformed (162). An adjustment is made in the wavelet domain to guarantee that the wavelets of the resulting image will generate the same compressed code (164). Next, the stored image is compared with the "smoothed" image (166). A determination is made as to whether there are only small changes to the image (168). If so, then an inverse wavelet transform is applied to the filtered image (170), and the new image is output (172). Otherwise, the smoothing process is repeated as necessary.

Figure 7:
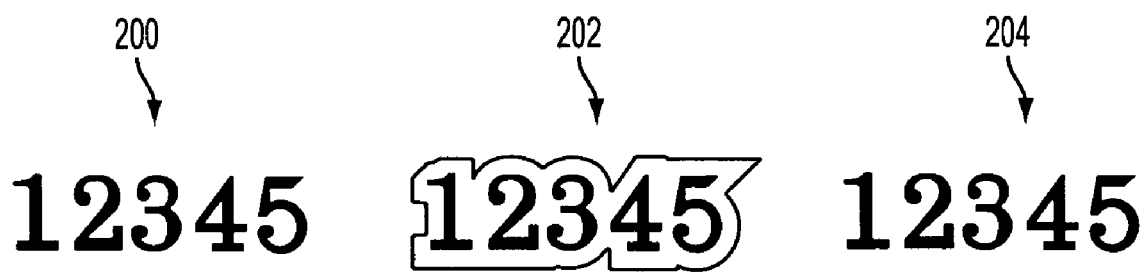
FIG. 7 shows an original image, a decompressed image using the conventional method, and the result using the new decompression method shown in FIG. 4.

One test example for the new JPEG 2000 decompression method described above is shown in FIG. 7, wherein reference numeral 200 refers to an original image, reference numeral 202 refers to the decompressed image using the conventional method with ringing artifacts, and reference numeral 204 refers to the result using the decompression method described above with reduced ringing artifacts.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of reducing artifacts introduced by a data compression procedure into digital image data to be printed, the method comprising:
   (a) receiving compressed digital image data;
   (b) performing decompression of the digital image data;
   (c) filtering the decompressed digital image data with a smoothing filter;
   (d) applying a wavelet transform to the filtered digital image data to obtain transform coefficients;
   (e) making an adjustment to the transform coefficients in the wavelet domain to guarantee that the wavelets of the resulting image will generate the same compressed code; and
   (f) recovering the image by applying an inverse wavelet transform to the adjusted transform coefficients.

2. The method defined in claim 1, further comprising: repeating steps (c) through (f) for a pre-determined number of iterations.

3. The method defined in claim 1, wherein the data compression procedure is JPEG 2000.

4. The method defined in claim 1, wherein the smoothing filter comprises an edge-preserving filter.

5. The method defined in claim 4, wherein the edge-preserving filter comprises a sigma filter.

6. The method defined in claim 1, further comprising:
   recovering the image by applying an inverse wavelet transform to the adjusted transform coefficients; and
   repeating steps (c) through (g), if substantial changes were made in the adjustment step (f).

7. The method defined in claim 5, wherein the data compression procedure is JPEG 2000.

8. The method defined in claim 5, wherein the smoothing filter comprises an edge-preserving filter.

9. The method defined in claim 8, wherein the edge-preserving filter comprises a sigma filter.

10. The method defined in claim 1, wherein the method is performed using an image processing system comprising at least one of a CPU, a memory, a hard disk, and an input/output unit.

11. A method of reducing artifacts introduced by a data compression procedure into digital image data to be printed, the method comprising:
    (a) receiving digital image data;
    (b) performing decompression of the digital image data;
    (c) storing the decompressed digital image data;
    (d) filtering the decompressed digital image data;
    (e) applying a wavelet transform to the filtered digital image data to obtain transform coefficients;
    (f) making an adjustment to the transform coefficients in the wavelet domain to guarantee that the wavelets of the resulting image will generate the same compressed code;
    (g) determining whether substantial changes have been made in the adjustment step (f); and
    (h) outputting the stored image, if no substantial changes were made in the adjustment step (f).

12. The method defined in claim 11, wherein the method is performed using an image processing system comprising at least one of a CPU, a memory, a hard disk, and an input/output unit.

13. A method of reducing artifacts introduced by a data compression procedure into digital image data to be printed, the method comprising:
    (a) receiving digital image data;
    (b) performing decompression of the digital image data;
    (c) storing the decompressed digital image data;
    (d) filtering the decompressed digital image data;
    (e) applying a wavelet transform to the filtered digital image data to obtain transform coefficients;
    (f) making an adjustment to the transform coefficients in the wavelet domain to guarantee that the wavelets of the resulting image will generate the same compressed code;
    (g) comparing the stored digital image data to the adjusted image and determining if there are only small changes to the filtered image data; and
    (h) if there are only small changes to the filtered image data, then applying an inverse wavelet transform to the filtered image data to obtain a new image and outputting the new image.

14. The method defined in claim 13, further comprising:
    recovering the image by applying an inverse wavelet transform to the adjusted transform coefficients; and
    repeating steps (c) through (g), if there are significant changes to the filtered image data.

15. The method defined in claim 13, wherein the data compression procedure is JPEG 2000.

16. The method defined in claim 13, wherein the smoothing filter comprises an edge-preserving filter.

17. The method defined in claim 16, wherein the edge-preserving filter comprises a sigma filter.

18. The method defined in claim 13, wherein the method is performed using an image processing system comprising at least one of a CPU, a memory, a hard disk, and an input/output unit.

19. An image processing system for reducing artifacts introduced by a data compression procedure into digital image data to be printed, the system comprising:
    a CPU;
    a memory;
    a hard disk; and
    an input/output unit,
    wherein the CPU is operative to:
        receive compressed digital image data;
        decompress the digital image data;

filter the decompressed digital image data with a smoothing filter;

apply a wavelet transform to the filtered digital image data to obtain transform coefficients;

make an adjustment to the transform coefficients in the wavelet domain to guarantee that the wavelets of the resulting image will generate the same compressed code; and recover the image by applying an inverse wavelet transform to the adjusted transform coefficients.

20. The system defined in claim 19, wherein the digital image data has been compressed according to JPEG 2000, the smoothing filter comprises an edge-preserving filter, and the edge-preserving filter comprises a sigma filter.

* * * * *